(12) United States Patent
Enrici

(10) Patent No.: US 12,470,485 B2
(45) Date of Patent: Nov. 11, 2025

(54) DEADLOCK PREVENTION OF SWITCH MEMORY OVERFLOW

(71) Applicant: Nokia Solutions and Networks Oy, Espoo (FI)

(72) Inventor: Andrea Enrici, Bourg la Reine (FR)

(73) Assignee: Nokia Solutions and Networks Oy, Espoo (FI)

( * ) Notice: Subject to any disclaimer, the term of this patent is extended or adjusted under 35 U.S.C. 154(b) by 192 days.

(21) Appl. No.: 18/063,346

(22) Filed: Dec. 8, 2022

(65) Prior Publication Data

US 2024/0195742 A1    Jun. 13, 2024

(51) Int. Cl.
  G06F 15/173    (2006.01)
  H04L 45/02     (2022.01)
  H04L 47/12     (2022.01)
  H04L 47/30     (2022.01)

(52) U.S. Cl.
  CPC .............. *H04L 47/12* (2013.01); *H04L 45/02* (2013.01); *H04L 47/30* (2013.01)

(58) Field of Classification Search
  CPC .......... H04L 47/12; H04L 45/02; H04L 47/30
  See application file for complete search history.

(56) References Cited

U.S. PATENT DOCUMENTS 5,781,546 A    7/1998  Sethu
9,042,222 B2   5/2015  Kwan et al.
9,244,880 B2 * 1/2016  Philip ............... G06F 15/17312
9,519,523 B2   12/2016 Dunn et al.
2005/0174942 A1 8/2005 Betker

OTHER PUBLICATIONS

J. Wu 'A Fault-Tolerant and Deadlock-Free Routing Protocol in 2D Meshes Based on Odd- Even Turn Model' *IEEE Transactions on Computers*, vol. 52, No. 9, Sep. 2003, pp. 1154-1169.

J. Sancho et al 'An Effective Methodology to Improve the Performance of the Up*/Down* Routing Algorithm' *IEEE Transaction on Parallel and Distributed Systems*, vol. 15, No. 8, Aug. 2004, pp. 740-754.

M. Karol et al 'Prevention of Deadlocks and Livelocks in Lossless Backpressured Packet Networks' *IEEE/ACM Transactions on Networking*, vol. 11, No. 6, Dec. 2003, pp. 923-934.

T. Skeie et al 'Layered Shortest Path (LASH) Routing in Irregular System Area Networks,' Jan. 2002, pp. 1-8.

B. Stephens et al 'Practical DCB for Improved Data Center Networks' *IEEE Conference on Computer Communications*, 2014, pp. 1-9.

(Continued)

*Primary Examiner* — Padma Mundur
(74) *Attorney, Agent, or Firm* — Harness, Dickey & Pierce, P.L.C.

(57) ABSTRACT

Example embodiments disclose a method for avoiding deadlock in a network includes generating a finite state machine indicating possible routing decisions of incoming packets for a plurality of switches, analyzing the finite state machine, determining at least one memory overflow state based on the analyzing, generating at least one anti-deadlock rule in response to determining the at least one memory overflow state, and transmitting the at least one anti-deadlock rule to the plurality of switches.

17 Claims, 5 Drawing Sheets

(56) References Cited

OTHER PUBLICATIONS

Extended European Search Report dated Mar. 14, 2024 for corresponding European Application No. 23210726.8.
S. Das et al. 'Formal Modeling of Network-on-Chip Using CFSM and Its Application in Detecting Deadlock' IEEE Transactions on very large scale integration (VLSI) systems, vol. 28, No. 4, 2020, pp. 1016-1029.
Y. Zhang et al. 'An Interactive Protocol Synthesis Algorithm Using a Global State Transition Graph' 8198 IEEE Transactions on Software Engineering, 14, No. 3, 1988, pp. 394-404.

\* cited by examiner

DEADLOCK PREVENTION OF SWITCH MEMORY OVERFLOW

BACKGROUND

Driven by the need for ultra-low latency, high throughput and low computer processing unit (CPU) overhead, major cloud service providers are deploying Remote Direct Memory Access (RDMA) in their datacenter networks.

RDMA over Converged Ethernet (RoCE) is an RDMA technology compatible with current IP and Ethernet based datacenter networks.

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

One or more example embodiments provide architectures and/or methods for reducing and/or preventing deadlocks in network topologies.

According to at least one example embodiment, a method for avoiding deadlock in a network includes generating a finite state machine indicating possible routing decisions of incoming packets for a plurality of switches, analyzing the finite state machine, determining at least one memory overflow state based on the analyzing, generating at least one anti-deadlock rule in response to determining the at least one memory overflow state, and transmitting the at least one anti-deadlock rule to the plurality of switches.

The at least one memory overflow state may indicate a transition between a state of a switch, of the plurality of switches, with a memory occupancy that is larger than an available memory space of the switch.

The transmitting may transmit the at least one anti-deadlock rule to the plurality of switches for use in routing the incoming packets at the plurality of switches.

The analyzing may analyze the finite state machine to determine a deadlock path within the network and the generating the at least one anti-deadlock rule may include generating the at least one anti-deadlock rule based on the deadlock path.

The generating the at least one anti-deadlock rule may include generating, for the deadlock path, at least one forbidden routing rule, the forbidden routing rule indicating a set of buffers associated with the forbidden routing rule and a list of temporarily forbidden routing rules local to a switch of the plurality of switches.

The analyzing may include noting a plurality of buffer allocations between states of the plurality of switches and the generating the at least one anti-deadlock rule may further include recording the set of buffers based on buffer allocations, of the plurality of buffer allocations, along the deadlock path.

The analyzing may include noting a plurality of routing rules that trigger a buffer allocation and the generating the at least one anti-deadlock rule may further include recording routing rules, of the plurality of routing rules, that trigger a buffer allocation along the deadlock path.

The generating the finite state machine may include generating the finite state machine in response to updating of a routing table of the plurality of switches.

The generating the finite state machine may include generating a plurality of individual finite state machines, each individual finite state machine of the plurality of individual finite state machines describing switch memory evolution as a consequence of an application of a routing rule, and combining the plurality of individual finite state machines to generate the finite state machine.

The finite state machine may describe all possible evolutions of memory in the plurality of switches according to routing decisions that can be taken on incoming packets.

According to at least one example embodiment, an apparatus for avoiding deadlock in a network includes a memory and processing circuitry configured to cause the apparatus to generate a finite state machine indicating possible routing decisions of incoming packets for a plurality of switches, analyze the finite state machine, determine at least one memory overflow state based on the analysis, generate at least one anti-deadlock rule in response to determining the at least one memory overflow state, and transmit the at least one anti-deadlock rule to the plurality of switches.

The at least one memory overflow state may indicate a transition between a state of a switch, of the plurality of switches, with a memory occupancy that is larger than an available memory space of the switch.

The processing circuitry may be further configured to cause the apparatus to transmit the at least one anti-deadlock rule to the plurality of switches for use in routing the incoming packets at the plurality of switches.

The processing circuitry may be further configured to cause the apparatus to analyze the finite state machine to determine a deadlock path within the network and generate the at least one anti-deadlock rule based on the deadlock path.

The processing circuitry may be further configured to cause the apparatus to generate the anti-deadlock rule by generating, for the deadlock path, at least one forbidden routing rule, the forbidden routing rule indicating a set of buffers associated with the forbidden routing rule and a list of temporarily forbidden routing rules local to a switch of the plurality of switches.

The processing circuitry may be further configured to cause the apparatus to note a plurality of buffer allocations between states of the plurality of switches during the analysis of the finite state machine and generate the at least one deadlock rule by recording the set of buffers based on buffer allocations, of the plurality of buffer allocations, along the deadlock path.

The processing circuitry may be further configured to cause the apparatus to note a plurality of routing rules that trigger a buffer allocation during the analysis of the finite state machine and generate the at least one deadlock rule by recording routing rules, of the plurality of routing rules, that trigger a buffer allocation along the deadlock path.

The processing circuitry may be further configured to cause the apparatus to generate the finite state machine in response to updating of a routing table of the plurality of switches.

The processing circuitry may be further configured to cause the apparatus to generate a plurality of individual finite state machines, each individual finite state machine of the plurality of individual finite state machines describing switch memory evolution as a consequence of an application of a routing rule and generate the finite state machine by combining the plurality of individual finite state machines.

According to at least one example embodiment, a method for avoiding deadlock in a network includes routing, by a switch of a plurality of switches, a data packet according to at least one anti-deadlock rule, the at least one anti-deadlock rule based on a deadlock path within the network, the deadlock path in the network based on at least one memory overflow state determined by an analysis of a finite state machine.

According to at least one example embodiment, an apparatus for avoiding deadlock in a network includes a means for generating a finite state machine indicating possible routing decisions of incoming packets for a plurality of switches, a means for analyzing the finite state machine, a means for determining at least one memory overflow state based on the analyzing, a means for generating at least one anti-deadlock rule in response to determining the at least one memory overflow state, and a means for transmitting the at least one anti-deadlock rule to the plurality of switches.

According to at least one example embodiment, a non-transitory computer-readable storage medium may store computer-readable instructions that, when executed, cause one or more processors to generate a finite state machine indicating possible routing decisions of incoming packets for a plurality of switches, analyze the finite state machine, determine at least one memory overflow state based on the analysis, generate at least one anti-deadlock rule in response to determining the at least one memory overflow state, and transmit the at least one anti-deadlock rule to the plurality of switches.

According to at least one example embodiment, an apparatus for avoiding deadlock in a network includes a memory and processing circuitry configured to cause the apparatus to route a data packet according to at least one anti-deadlock rule, the at least one anti-deadlock rule based on a deadlock path within the network, the deadlock path in the network based on at least one memory overflow state determined by an analysis of a finite state machine.

According to at least one example embodiment, an apparatus for avoiding deadlock in a network includes a means for routing a data packet according to at least one anti-deadlock rule, the at least one anti-deadlock rule based on a deadlock path within the network, the deadlock path in the network based on at least one memory overflow state determined by an analysis of a finite state machine.

According to at least one example embodiment, a non-transitory computer-readable storage medium may store computer-readable instructions that, when executed, cause one or more processors to route a data packet according to at least one anti-deadlock rule, the at least one anti-deadlock rule based on a deadlock path within the network, the deadlock path in the network based on at least one memory overflow state determined by an analysis of a finite state machine.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
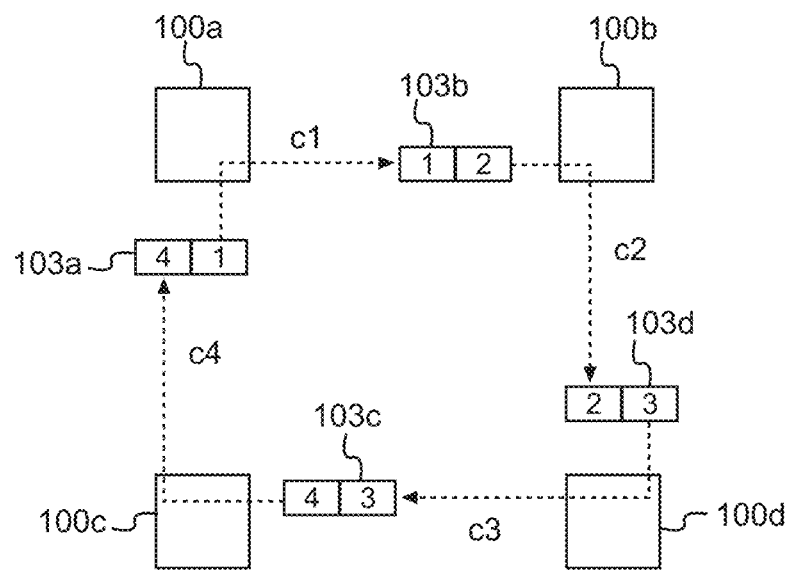
FIG. 1 is an example of a network topology exhibiting a deadlock situation.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

The deployment of Remote Direct Memory Access (RDMA) over Converged Ethernet (RoCE) requires Priority-based Flow Control (PFC) to provide a lossless L2 network. With PFC, packet loss can be avoided by letting a switch pause its immediate upstream device before buffer overflow occurs.

However, PFC can cause deadlocks. A deadlock refers to a standstill situation: there is a cyclic buffer dependency among a set of switches. Any switch in the cycle holds all the buffer needed by its upstream switch, and meanwhile is waiting for its downstream switch to release some buffer and resume its packet transmission.

When a deadlock occurs, no switch in the cycle can proceed. Further, throughput of the whole network or part of the network will go to zero due to the backpressure effect of PFC pause.

Deadlocks cannot recover automatically even after the problems that cause them (e.g., misconfiguration, failures/updates, etc.) have been fixed.

FIG. 1 is an example of a network topology exhibiting a deadlock situation.

Referring to FIG. 1, an example network topology includes switches 100*a*, 100*b*, 100*c*, and 100*d* including buffers 103a, 103b, 103c, and 103d, respectively. The switches 100a-100d are connected via channels c1, c2, c3, and c4. As shown in FIG. 1, packets 1, 2, 3, and 4 are being routed by the switches 100a-100d via the channels c1-c4 in a circular manner in a ring (or square mesh) network topology.

Channel c1 is occupied by packet 1, with its flow control units (flits) distributed among the buffers 103a and 103b in switches 100a and 100b. Packet 1 is waiting for packet 2 to release buffer space at buffer 103b of switch 100b.

Packet 2 is occupying channel c2, with its flits distributed among the buffer 103b and 103c in switches 100b and 100c.

Packet 2 in turn is waiting for packet 3 to release buffer space in buffer 103c of switch 100c.

Packet 3 is occupying channel c3, with its flits distributed among buffers 103c and 103d in switches 100c and 100d.

Packet 3 is waiting for packet 4 to release buffer space in buffer 103d of switch 100d.

Packet 4 is occupying channel c4, with its flits distributed among the buffers 103a and 103d in switches 100a and 100d, and packet 4 is waiting for packet 1 to release buffer space in buffer 103a of switch 100a.

Here, a deadlock occurs as packet 1 cannot release buffer space in buffer 103a of switch 100a and the flits related to other packets will not be able to advance due to the cyclic dependencies.

Existing solutions for deadlock remediation are based on deadlock avoidance strategies that analyze if the routing algorithm selected for a particular network topology creates potential deadlocks, and if so, then either additional hardware resources are added or restrictions are imposed on the routing to ensure freedom from deadlocks.

Usually, a dependency graph of the shared network resources is built and analyzed either statically or dynamically to determine routing restrictions if deadlock conditions exist.

For example, deadlock-free routing has been proposed as a solution as it guarantees that (if the routing configuration is correct) traffic does not cause deadlock. Unfortunately, achieving deadlock-free routing is inefficient, and may not even be viable.

Deadlock-free routing may be achieved by eliminating cyclic buffer dependencies. However, ensuring that there is no cyclic buffer dependencies may be relatively difficult. For example, deadlock-free routing largely limits the choice of topology (e.g., limited to tree-based topology). However, there are a number of other datacenter topologies and routing schemes that are not tree-based and do not have a deadlock-free guarantee.

Additionally, due to bugs or misconfigurations, deadlock-free routing configuration may become deadlock-vulnerable. A PFC deadlock in a tree-based datacenter can be caused by the unexpected flooding of lossless class traffic. Furthermore, routing loops may occur due to misconfiguration in today's production datacenters. If lossless traffic encounters any of these loops, cyclic buffer dependency may be unavoidable.

Example embodiments provide architectures and methods for reducing and/or preventing deadlocks in network topologies by creating a set of forbidden routing rules and distributing these rules to switches that store the rules in a dedicated memory (e.g., a look up table). A forbidden-routing rule is composed of a condition (logical condition for the rule to be applied) and a list of forbidden routing decisions.

Figure 2:
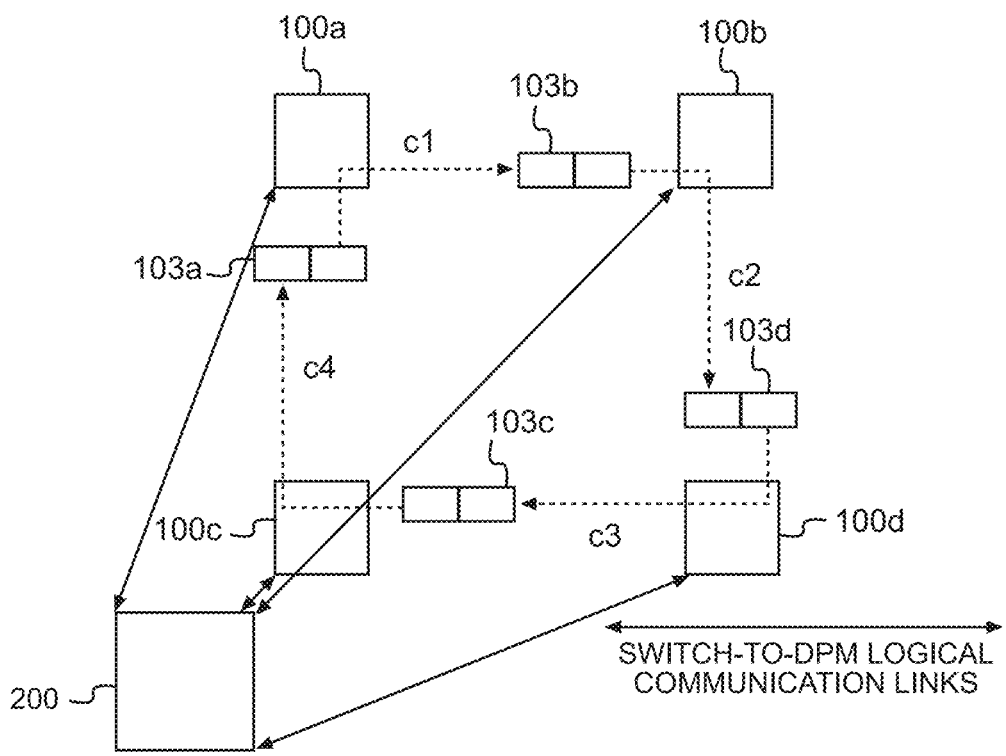
FIG. 2 is a block diagram illustrating a logical configuration of a network architecture according to example embodiments.

FIG. 2 is a block diagram illustrating a logical configuration of a network architecture according to example embodiments.

Referring to FIG. 2, a network architecture according to example embodiments may include a deadlock prevention module (DPM) 200 and switches 100a, 100b, 100c, and/or 100d under control of the DPM 200. However, example embodiments are not limited thereto and the number of switches may be any number greater than one. The switches 100a-100d are configured to communicate with each other via channels c1, c2, c3, and/or c4. The switches 100a-100d may communicate with the DPM 200 via logical communication links via buffers 103a-103d. The communication via the channels c1-c4 and/or the logical communication links may be transmitted via wired and/or wireless communication such as Ethernet and/or Wi-Fi communication.

Switch 100a will be primarily discussed in the present application, for convenience. However, it is to be understood that switches 100b-100d may be configured in the same manner as switch 100a.

The DPM 200 is illustrated as a separate unit in FIG. 2. However, example embodiments are not limited thereto and the DPM 200 may, for example, be embedded into switch 100a, or be distributed among multiple switches.

Each of switches 100a-100d periodically sends information to the DPM 200 regarding the status of the respective buffer 103a-103d, used to store incoming/outgoing packets (e.g., available buffer memory). The DPM 200 may either have a prior knowledge of the routing tables/rules of the switches under its control, or these routing tables/rules may be periodically sent to the DPM 200 by the switches 100a-100d.

The DPM 200 analyzes possible routing decisions that can be taken locally by each, or one or more, of the switches 100a-100d, and sends to each, or one or more, of switches 100a-100d a set of forbidden routing rules (e.g., do not route packet X on link Y, if condition Z is verified). The analysis of the possible routing decisions and generation of the set of forbidden routing rules will be described later with reference to FIG. 5.

Before taking a routing decision for an incoming packet, a switch consults the list of forbidden rules and takes a decision that does not violate any of the forbidden rules. If there is no possible decision for the switch to make that does not violate any of the forbidden rules, the switch may iteratively pause for some time (e.g., pause twice, for 10 ms each pause) in order to allow upstream and downstream buffers/switches to process packets and free buffer space. If after this operation, there is still no possible decision that does not violate a forbidden rule, then the switch lists rules in increasing order of a rule's (pre)conditions, then applies the rule with the greatest number of preconditions. Accordingly, network architectures according example embodiments may reduce and/or eliminate occurrence of deadlock scenarios.

Figure 3:
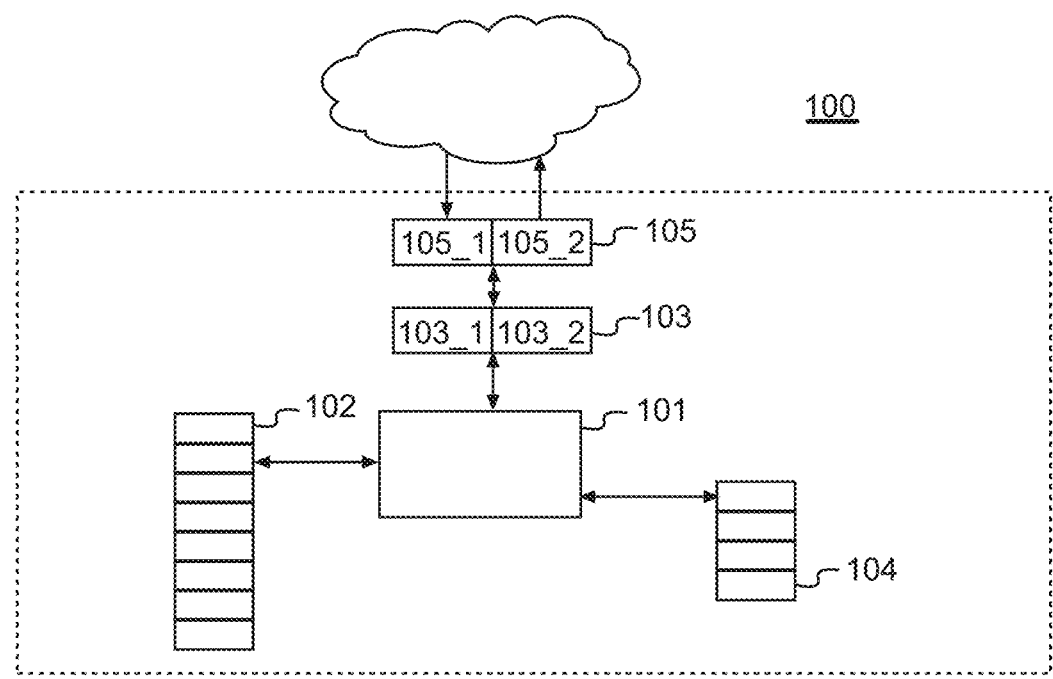
FIG. 3 is a block diagram illustrating a logical configuration of a network switch according to example embodiments.

FIG. 3 is a block diagram illustrating a logical configuration of a network switch according to example embodiments.

Referring to FIG. 3, a switch 100a may include a control unit 101a, internal memory 102a, communication buffers 103a, internal control and status registers 104a, and/or input/output (I/O) port 105a.

The control unit 101a may be a processor. More generally, the control unit 101a may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processor may be configured to carry out instructions of a computer program by performing the arithmetical, logical, and input/output operations of the system.

The memory 102a may store, for example, a look up table and/or forbidden routing rules. The forbidden routing rules will be discussed in more detail later.

The communication buffers 103a may store input and/or output requests. For example, the communication buffers 103a may store packets/flits being routed by the switch 103a. The communication buffers 103a may include input buffer 103a_1 and output buffer 103a_2.

The I/O port 105a may be configured to receive and transmit physical signals, e.g., an electrical signal, an optical signal, and/or a radio electromagnetic signal. The I/O port 105a may include input port 105a_1 and output port 105a_2.

The internal control and status registers 104a may be designed to store control information useable by the control unit 101a for controlling the switch 100a.

Figure 4:
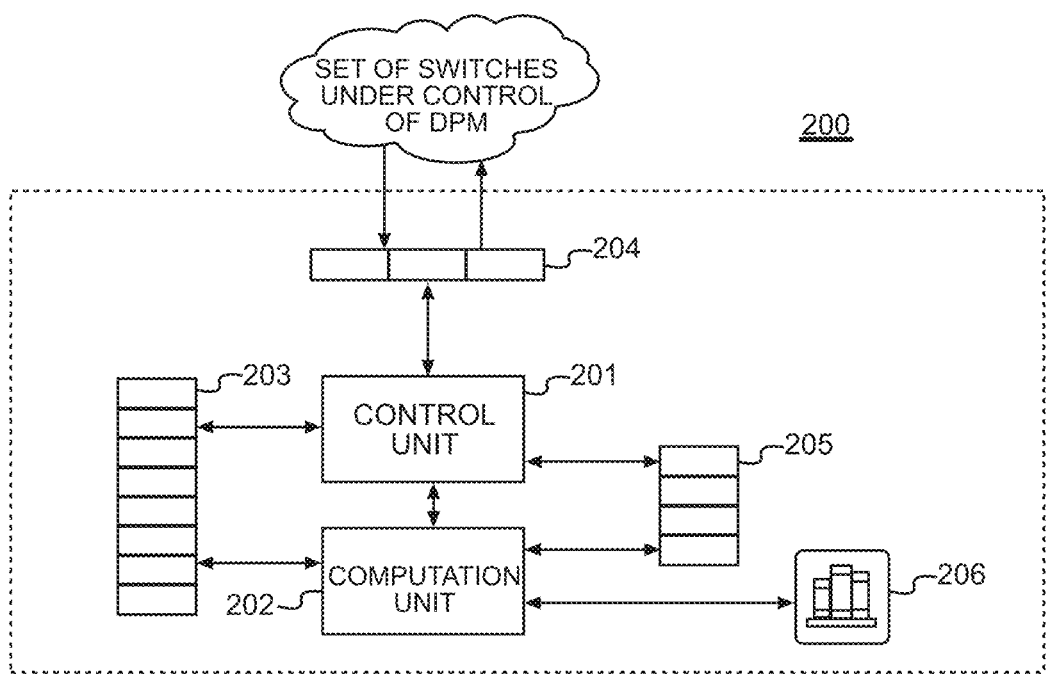
FIG. 4 is a block diagram illustrating a logical configuration of a deadlock prevention module according to example embodiments

FIG. 4 is a block diagram illustrating a logical configuration of a deadlock prevention module (DPM) according to example embodiments.

Referring to FIG. 4, a DPM 200 may include a control unit 201, a computation unit 202, an internal memory 203, communication buffers 204, internal control and status registers 205, and/or a library of algorithms 206.

The control unit 201 and the computation unit 202 are shown as separate units. However, example embodiments are not limited thereto and the computation unit 202 may be included in the control unit 201 or vice versa. The control unit 201 may be similar to the control unit 101a, described above. Therefore, repeated description is omitted.

The library of algorithms 206 may be stored, for example, in the internal memory 203. The library of algorithms 206 may include algorithms for finite state machine (FSM) construction and traversal (e.g., exact and/or heuristic).

The internal memory 203 may store, for example, the library of algorithms, 206, FSM queues, output results, etc. The communication buffer 204 may store, for example, input requests, output requests, library updates, etc. The DPM 200 may communicate with the switches 100 via the communication buffers 204.

Figure 5:
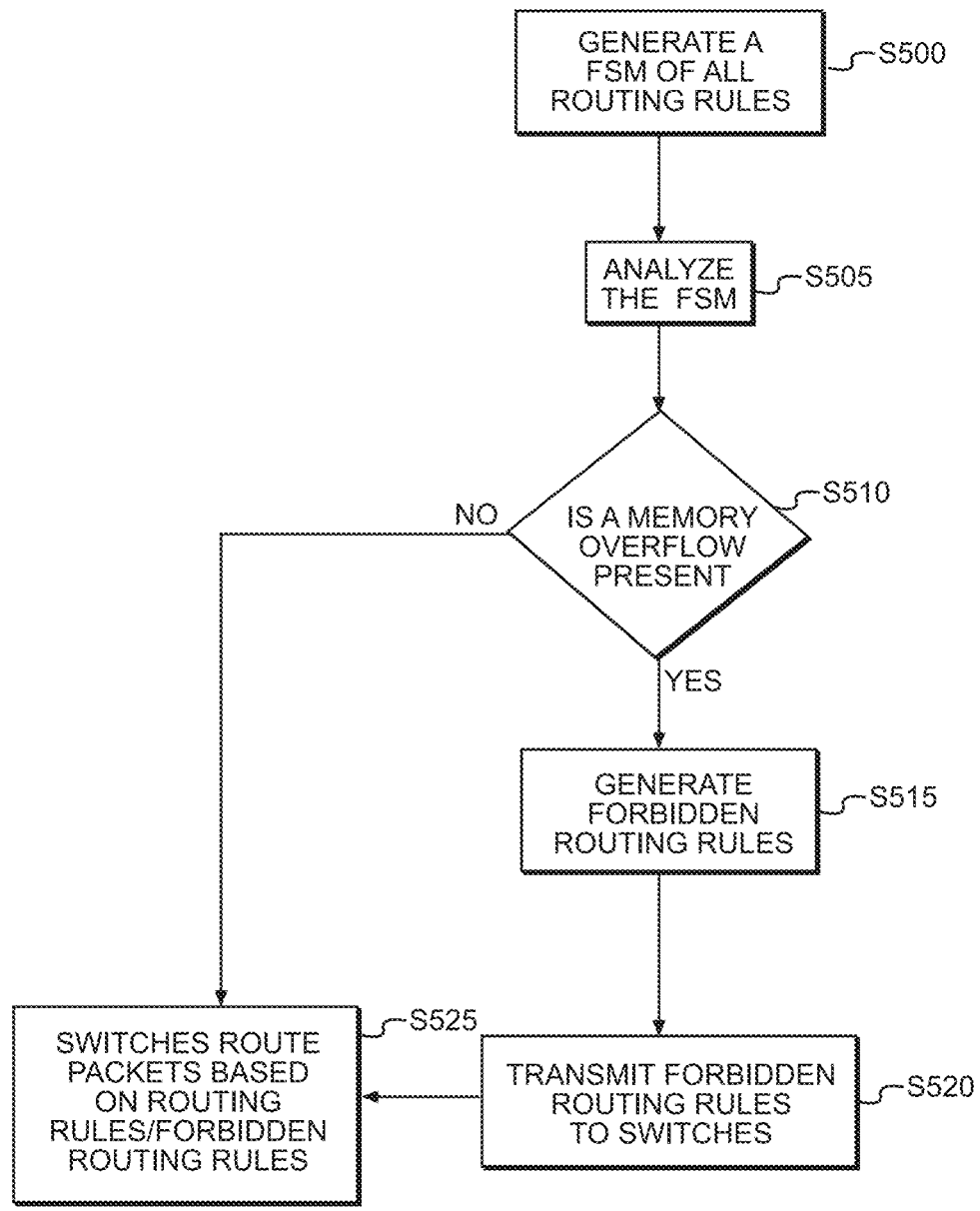
FIG. 5 is a flow chart illustrating a method according to example embodiments.

FIG. 5 is a flow chart illustrating a method for generating forbidden routing rules according to example embodiments.

Referring to FIG. 5, at step S500 the DPM 200 generates a final system FSM 750 (shown in FIG. 7B) of all routing rules of the switches 100a-100d under control of the DPM 200 based on the routing rules and the memory space of each switch 100a-100d. The DPM 200 may generate the final system FSM 750 in response to, for example, switch 100a updating its routing tables, network control messages informing the network components (e.g., switch 100a and/or DPM) of events that require re-routing of packets such as failure of network links, detection of congested links, etc.

Switch 100a may update its routing tables periodically by using dynamic routing protocols such as RIP (Routing Information Protocol), OSPF (Open Shortest Path first), BGP (Border Gateway Protocol), etc. Whenever there is a change in the network (e.g., shutdown of a router, link failure, etc.), all tables in the switch 100a may be updated via a dynamic routing protocol.

The final system FSM 750 describes all possible/relevant evolutions of the memory in buffers 103a-103d within each switch 100a-100d, according to the routing decisions that can be taken based on incoming packets/flits. Generation of the final system FSM 750 will be described in more detail with regard to FIGS. 6, 7A, and 7B.

Figure 6:
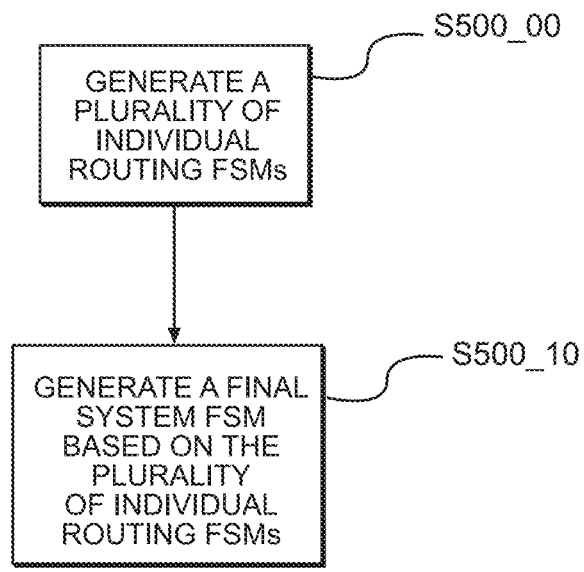
FIG. 6 is a flow chart illustrating a method according to example embodiments.

FIG. 6 is a flow chart illustrating a method for generating a final system FSM according to example embodiments.

Referring to FIG. 6, at step S500_00 the DPM 200 generates a plurality of individual routing FSMs. For example, switch 103a may generate an individual routing FSM according to input buffer 103a_1 and output buffer 103a_2. In more detail, the switch 103a may chain states with one start state, one end state, and a variable number of intermediate states interconnected by a single entry and a single exit transition. There are two intermediate states for each pair of input/output buffers 103a_1 and 103a_2: one state (e.g., state na2 shown in FIG. 7A) where memory is allocated to output buffer 103a_2 and one state (e.g., state na3 shown in FIG. 7A) where memory is deallocated from input buffer 103a_1. The allocation state always precedes the deallocation state. The ordering of the intermediate states that refer to different pairs of buffers may be arbitrarily selected as long the above precedence relation for a single pair is maintained.

Figure 7A:
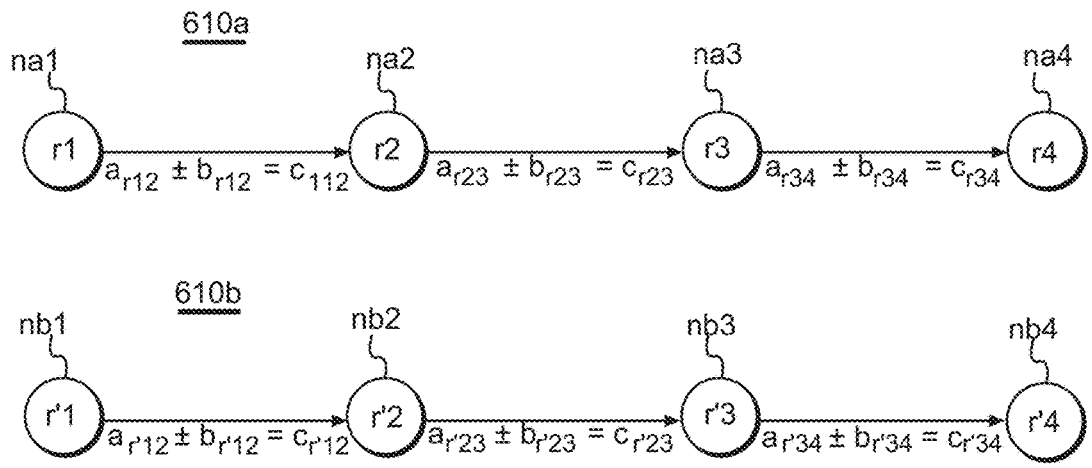
FIGS. 7A and 7B illustrate examples of finite state machines according to example embodiments.

FIG. 7A illustrates an example of finite state machines (FSMs) according to example embodiments.

Referring to FIG. 7A, examples of individual routing rule FSMs 710a and 710b are shown. Individual routing rule FSM 710a illustrates an example of an individual routing FSM that describes the switch memory evolution of switch 100a as a consequence of the application of one single routing rule r. Individual routing FSM 710b illustrates an example of an individual routing FSM that describes the switch memory evolution of switch 100a as a consequence of the application of one single routing rule r'.

As may be appreciated by FSM 710a and FSM 710b shown in in FIG. 7A, individual routing rule FSMs are typically linear FSMs. However, example embodiments are not limited thereto.

A node n in an individual routing FSM 710 denotes a switch system state that is the state of memory included in buffers 103a after a given routing decision has been taken by the switch 100a.

A node n is denoted via a tuple (Cn, Rn, Fn): Cn denotes the list of the switch's routing rules for which application has been completed, Rn denotes the list of the switch's routing rules for which application is currently being executed and Fn denotes a set of potential future rules (e.g., rules which may be applied in the future). For example, node n_a1 is denoted by the tuple $(C_{n\_a1}, R_{n\_a1}, F_{n\_a1})$.

Edges between nodes n in the individual routing FSM 710a denote transitions between states, where exactly one switch routing rule (e.g., rule r) is either applied or application of the routing rule is terminated. Edges are labeled with the variation of the memory in the buffer 103a of switch 100a, as a consequence of application of the routing rule r. Labels are in the form a±b=c, where a is the memory occupancy in the edge's start state, c is the memory occupancy in the edge's arrival state and ±b is the memory footprint variation due to the allocation/deallocation of memory space as a consequence of the application of the routing rule r.

As shown in FIG. 7A, node n_a1 indicates a state r1 of switch 100a, prior to the application of rule r, where some memory area is allocated in buffer 103a to host an incoming packet/flit. Nodes n_a2 and n_a3 indicate states r2 and r3, respectively. States r2 and r3 are states where the routing rule r is being applied. In state r2 additional memory area is allocated in output buffer 103_2 of buffer 103*a* as a consequence of the packet/flit being transferred from switch input port 105*a*_1 to switch output port 105*a*_2 (the packet/flit traverses an internal interconnect of the switch 100*a*). State r3 represents the state where a packet/flit arrives at the switch output port 105*a*_2 and memory area in the input buffer 103*a*_1 is deallocated. State r4 is the final state where routing rule r terminates application and memory is deallocated in the output buffer 103*a*_2 (the packet/flit leaves the switch 100*a*). Individual routing rule FSMs 710*a* and 710*b* are shown as including four states, however example embodiments are not limited thereto. For example a number and description of states of an individual routing FSM may depend upon input and output buffer 103*a*_1 and 103*a*_2 of a switch 100*a*.

Returning to FIG. 6, at step S500_10, the DPM 200 generates the final system FSM 750 based on the plurality of individual routing rule FSMs (e.g., FSM 710*a* and FSM 710*b*).

An example algorithm for generating the final system FSM 750 is shown below.

For each switch routing rule, produce the individual routing FSM and store this FSM in a list L.

Compute the product p of all FSMs in L as follows:

$$p = \{\}$$
$$\text{for } (k = 0; k < \text{length}(L) - 1; k++)$$
$$\text{if } (p == \{\})$$
$$p = L(k) \square L(k + 1);$$
$$\text{else}$$
$$p = p \square L(k) \square L(k + 1)$$

The product operator □ denotes a FSM product operation. The FSM product operation may be the Cartesian product of two individual routing rule FSMs, pruned of states that overflow at least one switch memory. To prune states, the DPM 200 first computes an FSM resulting from the Cartesian product of the two individual routing rule FSMs and then removes all memory-overflow states as well as any edge connected to these overflowing states. Such memory-overflow states are those where at least one incoming edge is annotated with a memory occupancy that is larger than the available switch's memory space.

Figure 7B:
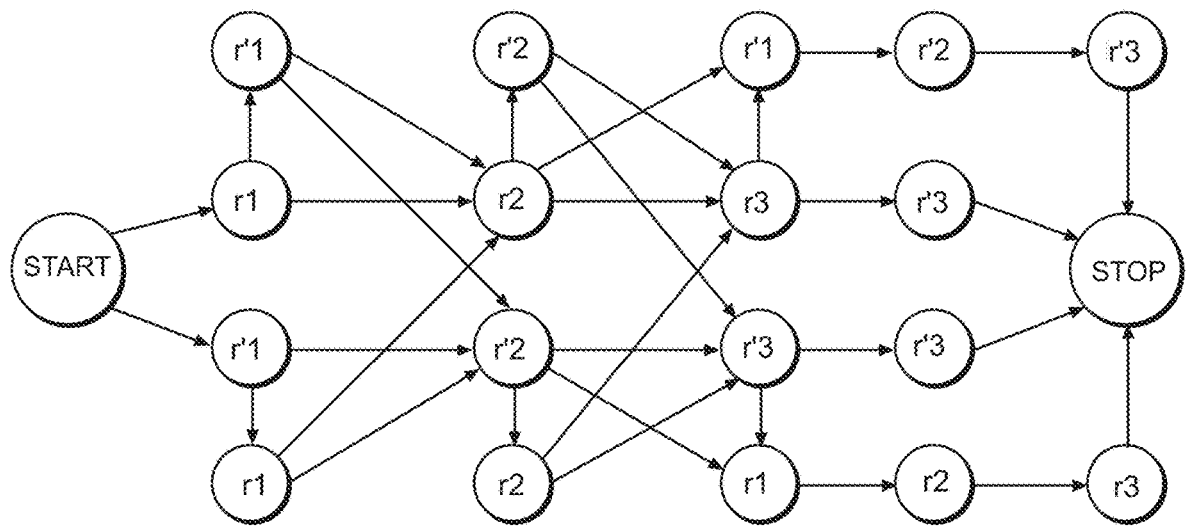

FIG. 7B illustrates an example of a final system FSM according to example embodiments.

Referring to FIG. 7B, the final system FSM 750 is an example of an FSM generated by combining individual routing rule FSM 710*a* and individual routing rule FSM 710*b* according to example embodiments. Nodes are labelled with the destination state from the individual FSMs in FIG. 7A. For example, states labelled as r2 in FIG. 7B means that they are reached after executing state r2 from the individual routing FSM 710*a*, as illustrated in FIG. 7A. Note that identical labels are used multiple times, but they refer to different states. For example, a state r2 may be reached by taking different paths from the start state.

Labels between transitions in FIG. 7B are not represented for the sake of simplicity. Such labels result from addition of the labels of the individual FSM transitions. An example of a transition label resulting from addition of the labels of the individual FSM transitions is "z=x±y", where x is the memory occupancy in the departure state, ±y is the memory variation associated to the transition and z is the final memory occupancy of the arrival state.

Returning to FIG. 5, at step S505, the DPM 200 analyzes the final system FSM 750.

The DPM 200 analyzes the final system FSM 750, for each switch 100*a*-100*d*, by searching for paths from the start state of the final system FSM 750 that lead to any state where a memory overflow is present. Each such a path is composed of a set of FSM transitions (edges) that correspond to routing decisions that can lead to a deadlock (overflow of switch memory). A path that can lead to a deadlock may be referred to as a deadlock path.

The DPM 200 may search for deadlock paths by traversing the final system FSM 750 according to any known graph traversal algorithm such as Depth-First Search (DFS) or Breadth-First Search (BFS).

The DPM 200 may note buffer allocations B and FSM annotations P of paths determined to be deadlock paths while traversing the final system FSM. The DPM 200 may record a set of buffers 103*a*-103*d* based on the buffer allocations B and/or a set of routing rules that trigger a buffer allocation corresponding the annotations P.

At step S510, the DPM 200 determines whether the final system FSM 750 includes any deadlock paths, based on the analysis of the final system FSM 750. If the DPM 200 determines that the final system FSM 750 includes a deadlock path (Y at S510), then the process proceeds to step S515.

At step S515, the DPM 200 generates forbidden routing rules. For each deadlock path determined during the analysis of the final system FSM 750, the DPM 200 generates a set of forbidden routing rules R in the form: R={B, P}, where B is the set of buffers 103*a*-103*d* that are allocated for the rule R to apply and P is the list of routing rules, local to switch 100*a*, which are temporarily forbidden. For example, The DPM 200 may record B and P during the analysis of the final system FSM 750. For example, the DPM 200 may generate the forbidden routing rule R based on the set of buffers 103*a*-103*d* and the routing rules recorded during the analysis of the final system FSM 750.

At step S520, the DPM 200 transmits the forbidden routing rules R to the switches 100*a*-100*d*.

At step S525, the switches 100*a*-100*d* route packets based on routing rules, including the forbidden routing rules R.

For example, as a result of a forbidden routing rule R, switch 100*a* will store a packet in the memory 102*a* until at least one of the buffers in B is deallocated before the switch 100*a* can resume transmission of the packet along its route to its destination switch.

Returning to step S510, if the DPM 200 determines that the final system FSM 750 does not include any deadlock paths (N at S510), then the process proceeds to step S525, at which the switches 100*a*-100*d* route packets based on routing rules.

Accordingly, by generating and analyzing a FSM to create forbidden rules for switches to follow when routing packets, example embodiments may reduce, avoid and/or prevent deadlock scenarios in a network topology. The DPM according to example embodiments is not limited to tree type network topologies. Therefore, the DPM according to example embodiments may reduce, avoid and/or prevent deadlock scenarios in networks of any topology type.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Some functions/acts noted in the figured may alternatively be omitted.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although directly, not necessarily and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/ information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A method for avoiding deadlock in a network, the method comprising:
   generating, in response to a first switch updating a routing table of the first switch, a finite state machine indicating possible routing decisions of incoming packets for a plurality of switches including first switch;
   analyzing the finite state machine;
   determining at least one memory overflow state of a buffer memory of at least one switch of the plurality of switches based on the analyzing;
   generating at least one anti-deadlock rule in response to determining the at least one memory overflow state; and
   transmitting the at least one anti-deadlock rule to the plurality of switches.

2. The method of claim 1, wherein the at least one memory overflow state indicates a transition between a state, in the finite state machine, of a second switch, of the plurality of switches, with a memory occupancy that is larger than an available memory space of the second switch.

3. The method of claim 1, wherein the transmitting transmits the at least one anti-deadlock rule to the plurality of switches for use in routing the incoming packets at the plurality of switches.

4. The method of claim 1, further comprising:
   analyzing the finite state machine to determine a deadlock path within the network based on the at least one memory overflow state,
   wherein the generating the at least one anti-deadlock rule includes generating the at least one anti-deadlock rule based on the deadlock path.

5. The method of claim 4, wherein the generating the at least one anti-deadlock rule comprises:
   generating, for switches along the deadlock path, at least one forbidden routing rule, the forbidden routing rule indicating
      a set of memory buffers of the switches along the deadlock path associated with the forbidden routing rule, and
      a list of forbidden routing rules local to a switch of the plurality of switches.

6. The method of claim 5,
   wherein the analyzing includes noting a plurality of buffer allocations, in the finite state machine, between states of the plurality of switches, and
   wherein the generating the at least one anti-deadlock rule generates the at least one anti-deadlock rule based on a set of memory buffers, of the plurality of switches along the deadlock path, based on buffer allocations, of the plurality of buffer allocations, along the deadlock path.

7. The method of claim 1, wherein the generating the finite state machine comprises:
   generating a plurality of individual routing rule finite state machines, each individual routing rule finite state machine of the plurality of individual routing rule finite state machines describing switch memory evolution, of the buffer memory of the plurality of switches, as a consequence of an application of a routing rule; and
   combining the plurality of individual routing rule finite state machines to generate the finite state machine.

8. The method of claim 1, wherein the finite state machine describes all possible evolutions of buffer memories of the plurality of switches according to routing decisions that can be taken by the plurality of switches on incoming packets.

9. An apparatus for avoiding deadlock in a network, the apparatus comprising:
   a memory; and
   processing circuitry configured to cause the apparatus to
      generate, in response to a first switch updating a routing table of the first switch, a finite state machine indicating possible routing decisions of incoming packets for a plurality of switches including the first switch,
      analyze the finite state machine,
      determine at least one memory overflow state of a buffer memory of at least one switch of the plurality of switches based on the analysis,
      generate at least one anti-deadlock rule in response to determining the at least one memory overflow state, and
      transmit the at least one anti-deadlock rule to the plurality of switches.

10. The apparatus of claim 9, wherein the at least one memory overflow state indicates a transition between a state, in the finite state machine, of a second switch, of the plurality of switches, with a memory occupancy that is larger than an available memory space of the second switch.

11. The apparatus of claim 9, wherein the processing circuitry is further configured to cause the apparatus to transmit the at least one anti-deadlock rule to the plurality of switches for use in routing the incoming packets at the plurality of switches.

12. The apparatus of claim 9, wherein the processing circuitry is further configured to cause the apparatus to:

analyze the finite state machine to determine a deadlock path within the network based on the at least one memory overflow state; and generate the at least one anti-deadlock rule based on the deadlock path.

13. The apparatus of claim 12, wherein the processing circuitry is further configured to cause the apparatus to generate the anti-deadlock rule by generating, for switches along the deadlock path, at least one forbidden routing rule, the forbidden routing rule indicating a set of memory buffers of the switches along the deadlock path associated with the forbidden routing rule, and a list of forbidden routing rules local to a switch of the plurality of switches.

14. The apparatus of claim 13, wherein the processing circuitry is further configured to cause the apparatus to note a plurality of buffer allocations, in the finite state machine, between states of the plurality of switches during the analysis of the finite state machine, and generate the at least one anti-deadlock rule based on a set of memory buffers, of the plurality of switches along the deadlock path, based on buffer allocations, of the plurality of buffer allocations, along the deadlock path.

15. The apparatus of claim 9, wherein the processing circuitry is further configured to cause the apparatus to:

generate a plurality of individual routing rule finite state machines, each individual routing rule finite state machine of the plurality of individual routing rule finite state machines describing switch memory evolution, of the buffer memory of the plurality of switches, as a consequence of an application of a routing rule; and generate the finite state machine by combining the plurality of individual routing rule finite state machines.

16. A method for avoiding deadlock in a network, the method comprising:

routing, by a first switch of a plurality of switches, a data packet according to at least one anti-deadlock rule, the at least one anti-deadlock rule based on a deadlock path within the network, the deadlock path in the network being determined by an analysis of a finite state machine indicating at least one memory overflow state of a buffer memory of at least one switch of the plurality of switches, the finite state machine having been generated in response to a second switch of the plurality of switches updating a routing table of the second switch.

17. The method of claim 1, wherein the analyzing analyzes the finite state machine to determine at least one deadlock path within the network, and the generating the at least one anti-deadlock rule includes generating at least one respective anti-deadlock rule based on each deadlock path of the at least one deadlock path.

* * * * *